United States Patent [19]

Killguss et al.

[11] Patent Number: 5,056,770
[45] Date of Patent: Oct. 15, 1991

[54] DEVICE FOR RELEASING A FILM SHEET ADHERING TO THE INNER SURFACE OF THE UPPER CASSETTE PORTION OF AN X-RAY FILM CASSETTE

[75] Inventors: Heinz Killguss, Kornwestheim; Bernd Mirlieb, Fellbach; Gerhard Quanz, Stuttgart, all of Fed. Rep. of Germany

[73] Assignee: Eastman Kodak Company, Rochester, N.Y.

[21] Appl. No.: 444,169

[22] PCT Filed: May 9, 1988

[86] PCT No.: PCT/EP88/00401
§ 371 Date: Nov. 8, 1989
§ 102(e) Date: Nov. 8, 1989

[87] PCT Pub. No.: WO88/09000
PCT Pub. Date: Nov. 17, 1988

[30] Foreign Application Priority Data

May 11, 1987 [DE] Fed. Rep. of Germany ....... 3715689

[51] Int. Cl.$^5$ .............................................. B65H 3/14
[52] U.S. Cl. .................................... 271/97; 271/105; 271/163; 271/164; 271/171; 414/404; 414/411; 53/381.1; 53/382.1; 53/266 R; 378/172; 378/182; 378/188
[58] Field of Search ................. 271/97, 105, 162, 163, 271/164, 171; 414/403, 404, 411; 53/381.1, 382.1, 244, 246, 266; 378/172, 181, 182, 188

[56] References Cited

U.S. PATENT DOCUMENTS

| 4,692,083 | 9/1987 | LeRoux et al. | 378/182 X |
| 4,811,547 | 3/1989 | Raats et al. | 53/382.1 X |
| 4,823,535 | 4/1989 | Schmidt et al. | 271/97 X |

FOREIGN PATENT DOCUMENTS

| 0263928 | 10/1985 | Japan | 378/188 |
| 0241537 | 10/1988 | Japan | 378/172 |

Primary Examiner—Joseph E. Valenza
Assistant Examiner—Carol Lynn Druzbick
Attorney, Agent, or Firm—G. Herman Childress

[57] ABSTRACT

Apparatus for loading and unloading x-ray film cassettes of various sizes, using an air jet to release a sheet of film from a pivotally open upper cassette part, the air jet nozzle being carried by a lever arrangement such that the nozzle is moved upwardly with the upper cassette part as the latter moves to its open position.

13 Claims, 5 Drawing Sheets

5,056,770

DEVICE FOR RELEASING A FILM SHEET ADHERING TO THE INNER SURFACE OF THE UPPER CASSETTE PORTION OF AN X-RAY FILM CASSETTE

TECHNICAL FIELD

The invention relates to a device for releasing a film sheet which adheres to the inner surface of the upper cassette portion of an X-ray film cassette when said upper cassette portion is pivoted to its open position, with the aid of air blown between the film sheet and the inner surface of the upper cassette portion.

BACKGROUND ART

A film-sheet releasing device of this type is known (DE-OS 30 00 760). The known device is associated with a slider provided in a cassette unloading and reloading apparatus for aligning and positioning an X-ray film cassette in the cassette unloading and reloading station of the apparatus. The slider is located laterally above a transport belt by means of which an X-ray film cassette is transported from an input point up to a final abutment in the unloading and reloading station. If an X-ray film cassette is present in the unloading and reloading station, it is brought into contact with a stationary abutment ledge opposite to the slider when said slider moves laterally towards the X-ray film cassette. The film-sheet releasing device consists of a number of probes in the form of blast tubes (air nozzles) which are arranged in the slider and extended pneumatically in the direction of the X-ray film cassette after the upper cassette portion has been slightly pivoted to its open position starting from the cassette side facing the slider. The blast tubes are moved below the marginal area of the slightly open upper cassette portion such that the blast air emitted by them can be distributed between the lower side of the upper cassette portion and a film sheet partially adhering to said lower side so that when the upper cassette portion is fully opened, the film sheet is not moved with it but remains in the lower cassette portion.

The probes are distributed at regular intervals across the length of the slider their number is determined by the length of an X-ray film cassette of maximum size.

Owing to the great number of probes each of which is associated with a pneumatically controlled device consisting of a pressure cylinder and a piston guided therein and provided with the probe, the film-sheet releasing device as a whole is very expensive and complicated.

DISCLOSURE OF THE INVENTION

It is the object of the invention to provide an inexpensive film-sheet releasing device of simple construction which operates reliably and precisely and which requires only one single air nozzle for releasing a film sheet from the upper cassette portion of X-ray film cassettes of various sizes.

In accordance with the invention this object is attained in that a linkage-type multiple-lever arrangement is hinged to a bar adapted for aligning and positioning X-ray film cassettes of different sizes, the last member of said multiple-lever arrangement extending into the path of movement of the upper cassette portion of the X-ray film cassettes when said upper portion is pivoted to its open position, and being engaged and held by said upper cassette portion, in that the multiple-lever arrangement can be pivoted along when the upper cassette portion is pivoted to its open position and in that the last member supports an air nozzle whose air jet is directed approximately tangentially past the front edge of a film sheet, seen in the input direction of the cassette, for releasing such film sheet if adhering to the inner surface of the film-sheet support of the other cassette portion.

According to a useful modification a linkage-type multiple-lever arrangement is hinged to at least one of two parallely guided bars movable towards and away from each other respectively for positioning the X-ray film cassette.

BRIEF DESCRIPTION OF THE DRAWINGS

The invention will now be described in further detail with reference to an embodiment illustrated in the drawings in which.

PREFERRED MODE OF CARRYING OUT THE INVENTION

Figure 3:
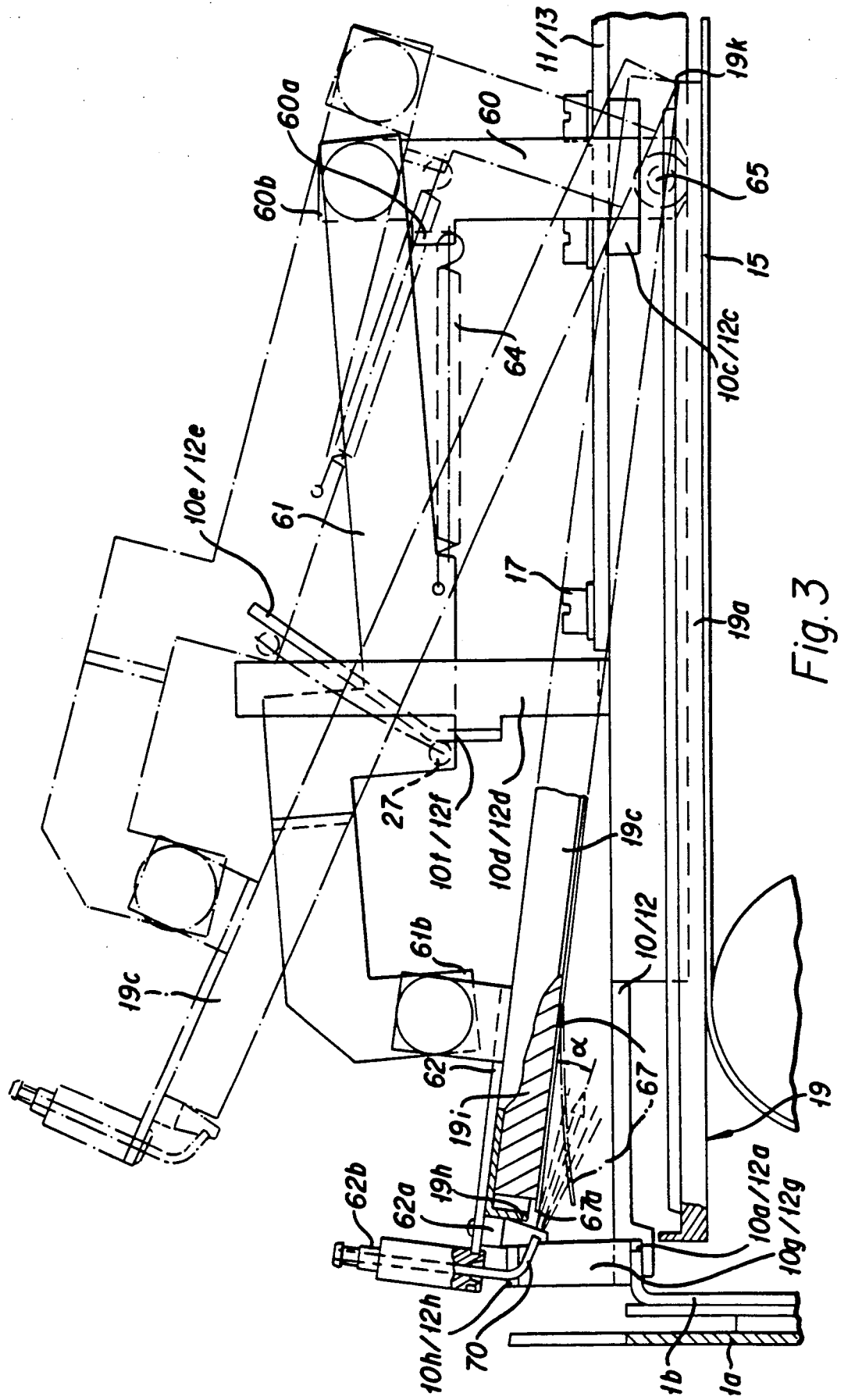
FIG. 3 shows a sectional view along line 11-11 of FIG. 2, illustrating the film-sheet releasing device in various functional positions of the pivotable upper cassette portion in an X-ray film cassette of small size.

The apparatus comprising the invention serves for the loading and unloading of x-ray film cassettes such as are shown at 19 and 190 in the drawings, 19 being a smaller cassette and 190 being a larger one. Except for size the two types of cassette are identical. Each has a lower part or portion 19a, 190a and an upper part 19c, 190c, the leading end of the upper part having an end surface 19h, 190h. Upper part 19c, 190c carries an inner film sheet support, one of which is shown at 19i. Film is shown at 67, 68 and, as shown in FIG. 3, projects slightly beyond the end of support 19i. The cassette shown in FIG. 3 has a hinge 19k at its rear end, by which the upper part 19c is hinged to the lower cassette part 19a. The larger size cassette of FIG. 4 has a similar hinge construction which is not visible in the drawings. It will be understood that the film tends to adhere to support 19i and the similar part in the larger size cassette, hence the need for means for separating the film from that support to facilitate removal of the film from the cassette.

Figure 1:
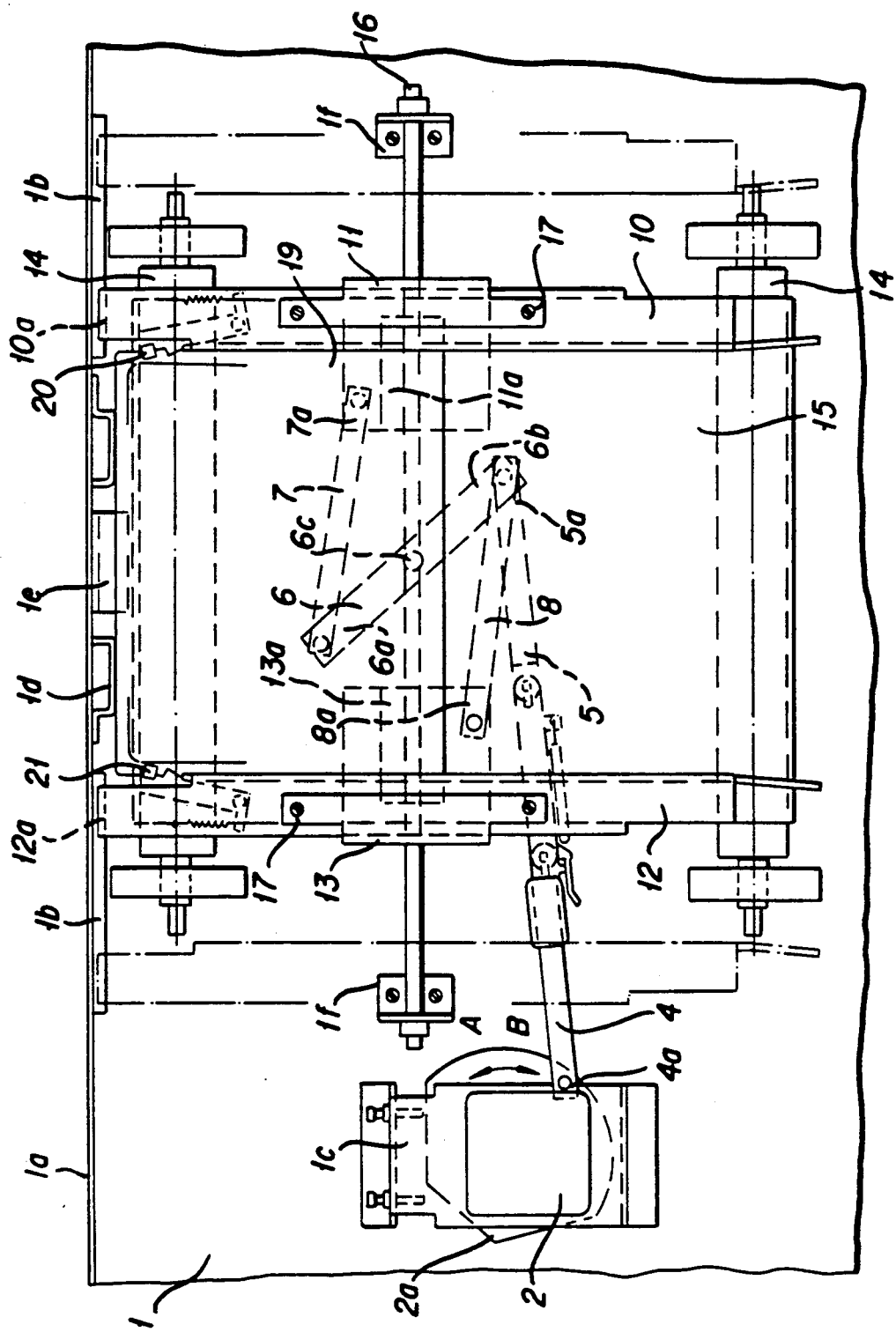
FIG. 1 shows a plan view of a cassette-positioning device consisting of two parallely guided bars which are movable towards and away from each other respectively.

In an apparatus 1 for unloading exposed film sheets from X-ray film cassettes of different sizes and reloading the cassettes with unexposed film sheets, a device for positioning the X-ray film cassettes, loaded into the device edgewise from the bottom of FIG. 1, is provided in the area of the unloading and reloading station. This positioning device comprises two parallely guided bars 10 and 12 which are movable towards and away from each other respectively above a transport belt 15 which transports an X-ray film cassette 19 from an input point to the unloading and reloading station. The transport belt 15 is placed around two shafts 14 one of which is driven.

Figure 5:
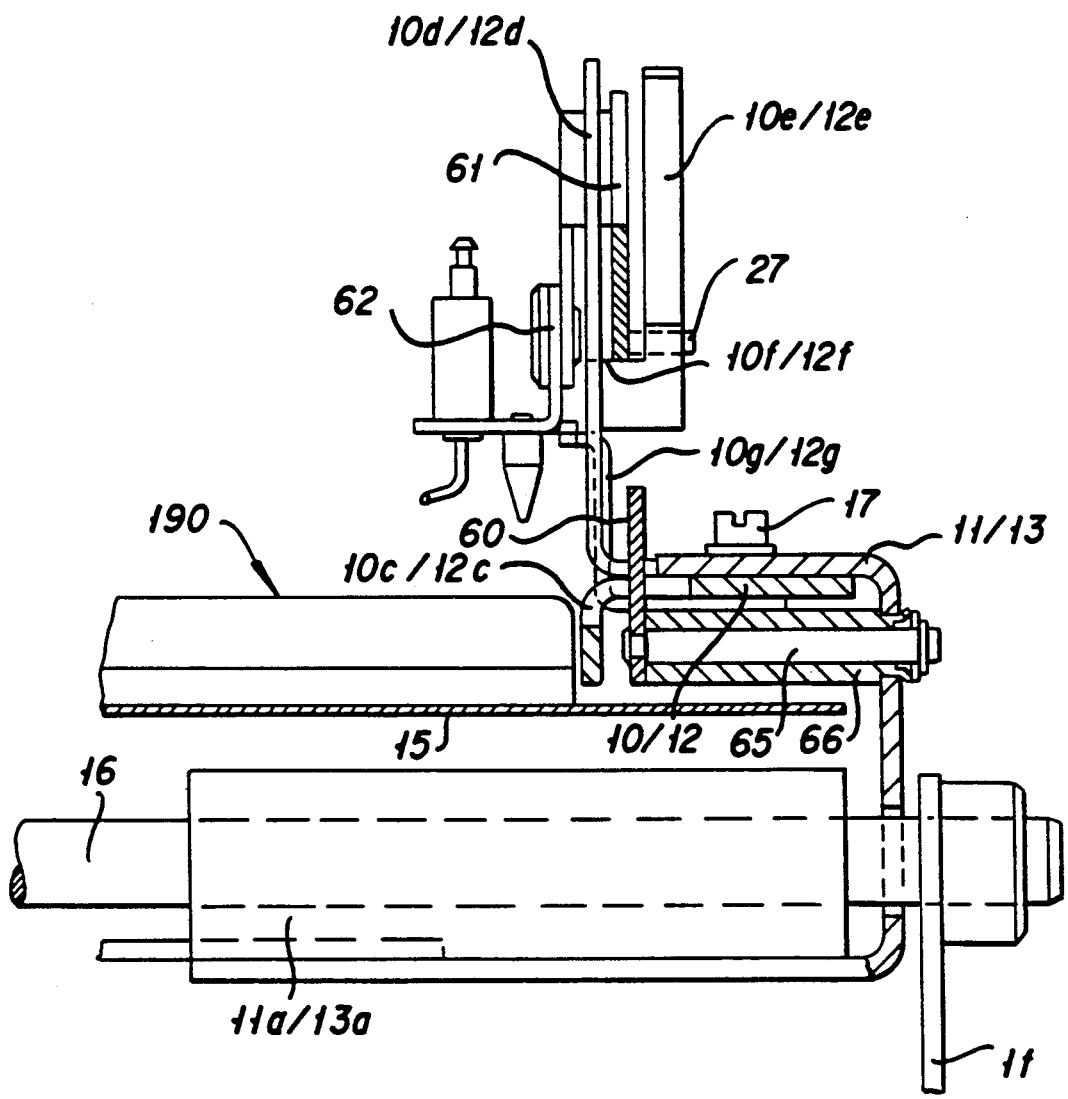
FIG. 5 shows a sectional view along line IV-IV in FIG. 4 illustrating the film-sheet releasing device.

As can be seen in particular from FIGS. 1 and 5 the bars 10 and 12, which serve as guide members are mounted by means of screws 17 to angle plates 11 and 13. Each angle plate 11 and 13 respectively is shiftably mounted by means of a bushing 11a and 13a respectively on a guide shaft 16 held between two mounting angles 1f of the apparatus. At the ends of the bars 10 and 12 extending into the interior of the apparatus, guide grooves 10a and 12a are provided by means of which the bars 10 and 12 are additionally guided for sliding movement on guide rails 1b arranged on a partition wall 1a of the apparatus. The numeral 1e denotes a cassette-abutment ramp situated on the partition wall and the numeral 1d two cassette abutments mounted to said partition wall.

The bars 10 and 12 are operated by means of a symmetric lever arrangement situated between said bars and consisting of a two-arm lever 6 centrally mounted for rotation about a stationary pin 6c. A first lever arm 7 pointing to the right is hinged to one free lever end 6a and a second lever arm 8 pointing to the left is hinged to the other free lever end 6b. The free ends 7a and 8a of the two lever arms 7 and 8 are hinged to the angle plates 11 and 13 supporting the bars 10 and 12.

The numeral 2 denotes a drive motor screwed to a holding angle 1c provided on the apparatus. The free end 4a of a portion 4 of a rod consisting of two portions 4 and 5 movable relative to each other is hinged to a crank disk 2a seated on the motor shaft and rotatable to and fro in the direction of the arrows "A" and "B" by the motor. The other free end 5a of portion 5 of the rod directly engages the hinge between lever 6 and the lever arm 8 pointing towards the left.

In the area of each free end of the two bars 10 and 12 extending into the interior of the apparatus, a hold-down lever 20 and 21 is mounted which can be pivoted into and out of the transport path of the X-ray film cassette.

X-ray film cassettes of various sizes are used. In the case of the embodiment shown, only an X-ray film cassette 19 of minimum size and an X-ray film cassette 190 of maximum size are shown. When an X-ray film cassette 19, 190 is fed into the input slot of the apparatus, the front edge of the cassette enters first and the cassette is transported from the input point to the unloading and reloading station. Motor 2 is switched on via switch means not illustrated in detail as soon as the front side of the cassette makes contact with one of the abutments 1d, the motor operating the symmetric lever arrangement 6, 7 and 8 by means of the crank disk 2a, rotating in the direction "A" and the 4, rod 5 hinged to it, causing the bars 10 and 12 to move towards each other from the initial position shown in dash-dotted lines in FIG. 1 until they make contact with the cassette side walls so that the X-ray film cassette is aligned and exactly positioned.

A multiple-lever arrangement 60, 61 and 62 whose end member 62 carries an air nozzle 70 as will be described in detail further below, is hinged to at least one of the two bars 10, 12.

Figure 2:
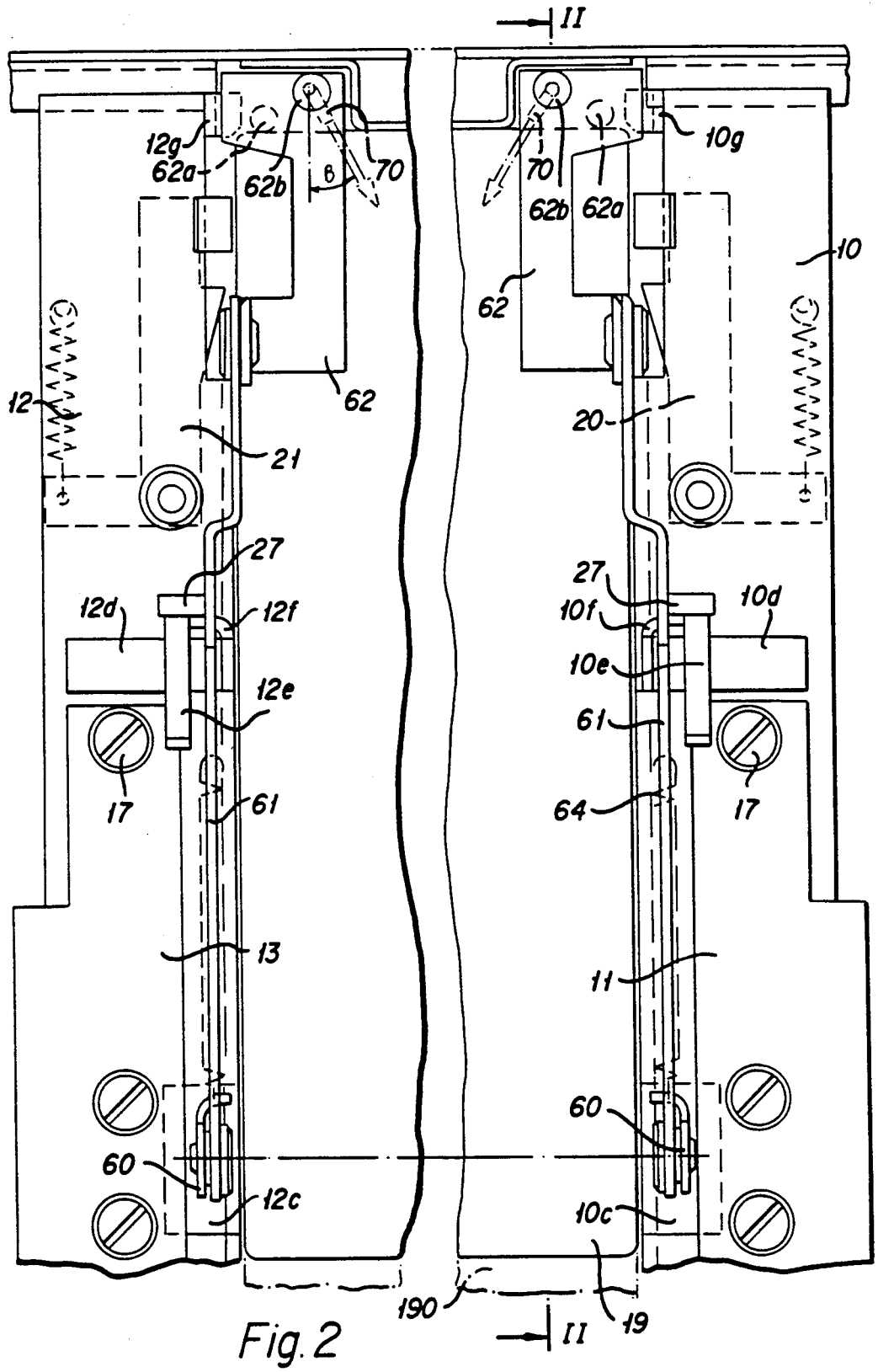
FIG. 2 shows a plan view of part of the positioning device according to FIG. 1 with a film-sheet releasing device hinged to each bar.

In the embodiment shown, the multiple-lever arrangement 60, 61 and 62 is provided on both bars 10 and 12 (FIG. 2). For this purpose, a bushing 66 (FIG. 5) is riveted to each of the angle plates 11 and 13 supporting the bars 10 and 12. Pins 65 are mounted for rotation in the bushings 66. On each of the pins 65 is pivoted, a vertically extending first lever arm 60 which projects through a recess 10c, 12c of bars 10 and 12. A second lever arm 61 is hinged to the free end 60b of each lever arm 60 (FIGS. 3 and 4), and is held by the force of a tension spring 64 connected to lever 60, against an abutment 60a is which limits the counterclockwise movement as seen in FIG. 3. Arm 61 extends parallel to the direction of feed of the cassette. The last member 62, which extends into the path of movement of the pivotable upper cassette portion 19c and 190c respectively when the bars 10 and 12 rest against the side walls of the cassette, is hinged to the free end 61b of the second lever arm. Member 62 carries the air nozzle 70 and a tapered downwardly extending pin 62a riveted adjacent to said nozzle.

The second lever arm 61 and the last member 62 of each multiple-lever arrangement rest loosely on support means arranged on the two bars 10 and 12. First angle portion 10d, 12d, provided with support surface 10f, 12f, serve as a support means for the second lever arm 61. Second angle portions 10g, 12g, extending upwardly from members 10, 12, provided with support surfaces 10h, 12h (FIG. 3), serve as support means for the last member 62. Each of the first angle portions 10d and 12d comprises an upwardly extending, inclined guide sheet 10e and 12e cooperating with a sensing pin 27 provided on the second lever arm 61 such that the multiple-lever arrangements assume a predefined initial position with respect to the front end face 19h and 190h respectively of the upper cassette portion 19c and 190c respectively.

Operation

Figure 4:
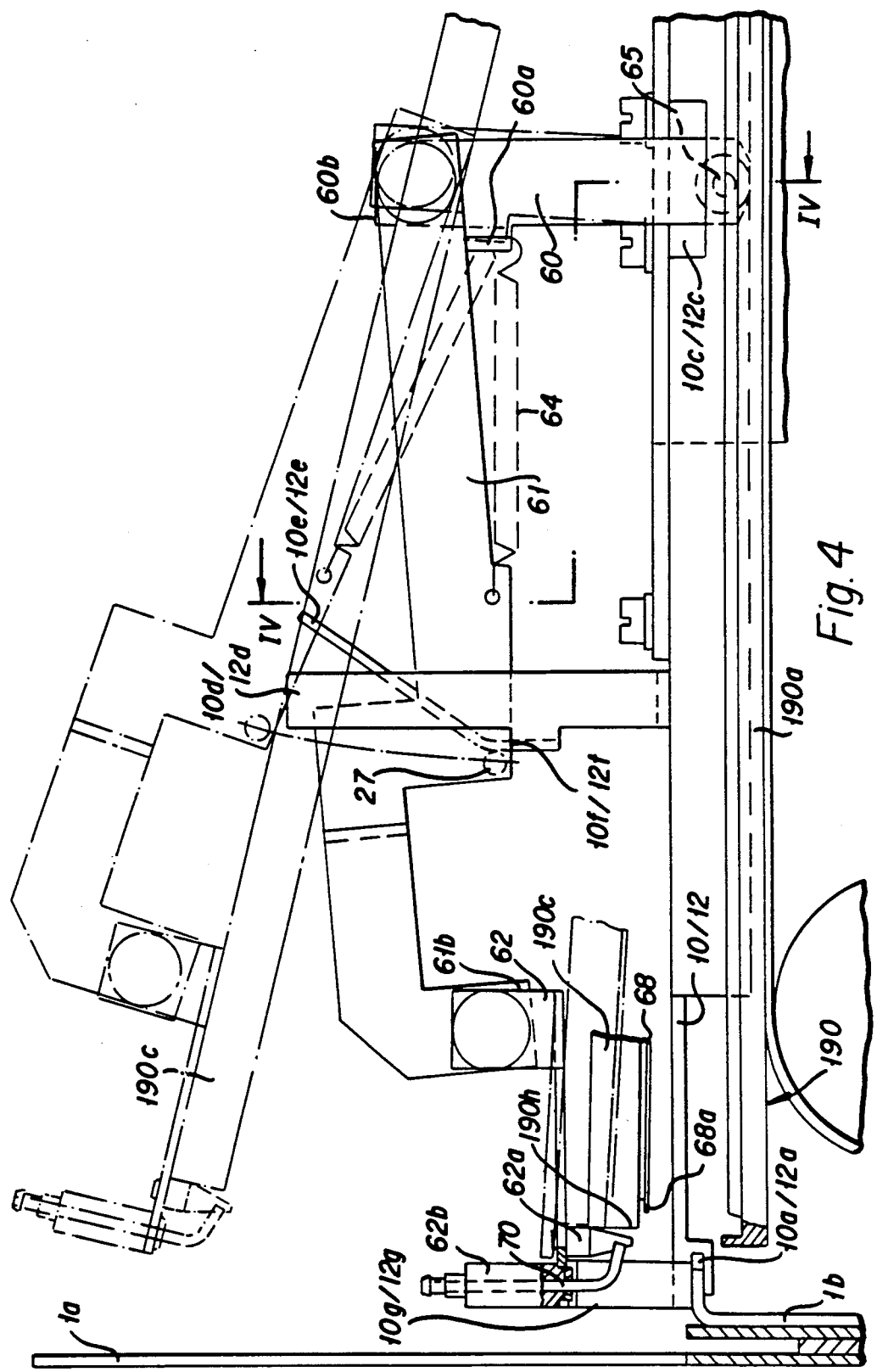
FIG. 4 shows a sectional view along line 11-11 in FIG. 2, illustrating the film-sheet releasing device in various functional positions of the pivotable upper cassette portion in an X-ray film cassette of large size.

With a cassette 19, 190 centered in its functional position in the unloading and reloading station by means of bar members 10, 12, the upper cassette part 19c, 190c is pivoted by known means (not shown) to the positions shown in dash-dotted lines in FIGS. 3 and 4. After initial upward movement the downwardly extending front end face 19h, 190h of the upper cassette part 19c, 190c engages and slides along pins 62a until the upper cassette part 19c, 190c contacts the lower surface of the last member 62. Further pivoting of the upper cassette part to its open position rotates the multiple lever arrangement 60-62 about pin 65. During this movement, sensing pin 27, located on second lever arm 61, leaves the guides 10e, 12e of the supporting angles 10d, 12d so that the multiple lever arrangements are only held by pin 62a on the end face 19h, 190h of the open cassette upper part 19c, 190c.

As shown in FIG. 3, air nozzle 70 is vertically shiftable and horizontally rotatable in a holder 62b fixed tot he last member 62. The end of nozzle 70 is canted toward end faces 19h, 190h of the upper cassette part 19c, 190c. The canting angle "α" is 5 to 50 degrees with respect to the plane of film sheet 67c. As can be seen from FIG. 2, the end of air nozzle 70 is also directed inwardly int eh horizontal direction by an angle "β" of about 20 to 40 degrees with respect to the input direction of cassette 19, 190.

While the upper cassette portion 19c and 190c is being pivoted into the position shown in dash-dotted lines air is blown through the air nozzle 70 for a period of about 0.3 to 0.8 seconds. Air nozzle 70 is adjusted in the vertical direction so that its bent off portion is aligned with respect to the support plane of film sheet 67, 68 in such manner that an air jet emitted from the nozzle is directed approximately tangentially past the front edge 67a, 68a of a film sheet still adhering to the inner surface of the film sheet support 19i of the upper cassette part. By shifting the air nozzle 70 in the vertical direction, a position is defined in which its bent-off portion is aligned with respect to the support plane of the film sheet 67 and 68 respectively such that an air jet emitted is directed approximately tangentially past the front edge 67a and 68a respectively of a film sheet 67 and 68 respectively still adhering to the inner surface of the film-sheet support 19i of the upper cassette portion 19c and 190c respectively.

Due to a difference in the pressure of the air at rest in the area above the film sheet front edge 67a, 68a which projects from film sheet support 19i, and the air moved at high speed across the front edge 67a, 68a of the film sheet by the air jet, which air continues to flow below the film sheet, a directional force is obtained which acts on the upper side of the projecting film sheet in the downward direction. This causes the front marginal area of the film sheet to separate in a downward direction. At that moment, part of the substantially slower air stream which surrounds the sharply directed air jet can reach the space between film sheet 67, 68 and film sheet support 19i, and there builds up an air cushion so that film sheet 67, 68 is rapidly and readily released from film sheet support 19i located in the open upper cassette part 19c, 190c, whereupon the sheet drops downwardly into lower cassette portion 19a, 190a. Subsequently the exposed film sheet is withdrawn from the lower cassette portion and transported into a development station whilst an unexposed new film sheet is transported into the lower cassette portion. After the upper cassette portion has been pivoted to its closed position, the X-ray film cassette is removed from the apparatus. As shown in FIG. 3 the hinge 19k of the pivotable upper cassette portion 19c of an X-ray film cassette 19 of small size is located in the area of the pin 65 of the support for the multiple-lever arrangement. Owing to the short length of the upper cassette portion 19c in this case, the spring-biased second lever arm 61, which is hinged to the upright first lever arm 60 rests on the abutment 60a of the first lever arm 60 when the upper cassette portion is in its open position. The multiple-lever arrangement 60, 61 and 62 is only pivoted about pin 65, since the proximity of pin 65 and cassette hinge 19k requires only that the upright lever arm 60 pivot rearwardly at approximately the same angle as the opening angle of upper cassette portion 19c.

FIG. 4 shows that the hinge (not illustrated) of the pivotable upper cassette portion 190c of an X-ray film cassette 190 of large size is far from pin 65. Owing to the great length of the upper cassette portion 190c in this case, the second lever arm 61, hinged to the upright first lever arm 60, is pivoted away from the abutment 60a of the first lever arm 60 in opposition to the force of tension spring 64 when the upper cassette portion is in its open position in this case so that the pivotal movement of the multiple-lever arrangement 60-62 takes place substantially about the hinge between the second lever arm 61 and the upright first lever 60. The upright first lever arm 60 only carries out a slightly rearwardly directed compensating pivotal movement about pin 65.

Due to the linkage-type design of the multiple lever arrangement 60-62 it is ensured that the last member 62 always contacts the pivotable upper cassette parts of various sizes and is held at the end faces of the upper cassette parts and pivoted by pivoting movement of said upper cassette parts moving to their open positions. As a result, air nozzle 70 is in its functional position at any opening angle of the upper cassette parts, regardless of the length of the cassette.

We claim:

1. In apparatus for loading and unloading x-ray film cassettes of the type having a lower part and an upper part, the latter being raised to separate it from the lower part for loading and unloading, which apparatus utilizes air jet means to separate film from the raised upper cassette part; the improvement comprising:

means operated by movement of said upper cassette part toward its raised position to move said air jet means along with said upper cassette part.

2. Apparatus according to claim 1, said apparatus having parallel lateral edge guide means for positioning the cassette, said improvement further comprising:

said means operated by movement of said upper cassette part comprising a multiple lever arrangement mounted on said guide means, said lever arrangement comprising a first lever arm hinged to said guide means and extending upwardly, said first lever arm having an abutment, a second lever arm hinged to said first lever arm, biasing means urging said second lever arm against said abutment, and a third lever arm hinged to said second lever arm, said third lever arm having a portion extending into the path of upward movement of said upper cassette part, said third lever arm having a projection for engaging the inner face of said upper cassette part and carrying air jet means for releasing film from said upper cassette part.

3. Apparatus according to claim 2, said improvement further comprising:

means for positioning said second lever arm to assure that it and said third lever arm assume predefined initial positions with respect to the leading edge of a cassette, said means for positioning comprising an upwardly inclined guide member and a sensing pin carried by said second lever arm for cooperation with said guide member.

4. Apparatus according to claim 1, said improvement further comprising:

said means for moving said air jet means having an element that is contacted by a surface of said upper cassette part to accomplish said movement of said air jet means.

5. Apparatus according to claim 4, said cassettes being hinged together at one end, said improvement further comprising:

said means operated by movement of said upper cassette part comprising hinged means.

6. Apparatus according to claim 5, said improvement further comprising:

said air jet means being carried by said hinged means.

7. Apparatus according to claim 6, said apparatus having parallel lateral edge guide means movable toward and away from each other to position said cassette, said improvement further comprising:

said hinged means being mounted on said edge guide means.

8. Apparatus according to claim 7, said improvement further comprising:

said hinged means comprising a multiple lever arrangement.

9. Apparatus according to claim 8, said improvement further comprising:

means biasing said hinged means toward the upper surface of said upper cassette part.

10. Apparatus according to claim 9, said improvement further comprising:
means defining a rest position for said hinged means and air jet means, said rest position being spaced above the upper surface of a cassette being fed into and out of the apparatus.

11. Apparatus according to claim 10, said improvement further comprising:
said air jet means having a nozzle for directing an air jet downwardly and tangentially with respect to an edge of film adhering to said upper cassette part.

12. Apparatus according to claim 11, said improvement further comprising:
said nozzle also directing the air jet sideways and diagonally with respect to the film.

13. Apparatus according to claim 12, said improvement further comprising:
said air jet means being positioned to direct air at an angle of 5-50 degrees with respect to the plane of the film, and at an angle of 20-40 degrees horizontally sideways with respect to the direction of cassette input into the apparatus.

* * * * *